United States Patent
Kasako et al.

(10) Patent No.: US 6,892,203 B2
(45) Date of Patent: May 10, 2005

(54) METHOD, APPARATUS AND SYSTEM FOR REMOTE FILE SHARING

(75) Inventors: Naohisa Kasako, Odawara (JP); Shigeru Kishiro, Odawara (JP); Takahiko Takeda, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 446 days.

(21) Appl. No.: 10/222,034

(22) Filed: Aug. 16, 2002

(65) Prior Publication Data

US 2003/0074417 A1 Apr. 17, 2003

(30) Foreign Application Priority Data

Sep. 7, 2001 (JP) .......................... 2001-271580

(51) Int. Cl.[7] .............................................. G06F 17/30
(52) U.S. Cl. ....................... 707/10; 707/201; 709/223; 709/212; 370/380
(58) Field of Search .................. 707/10, 201; 709/212, 709/223; 370/380

(56) References Cited

U.S. PATENT DOCUMENTS 5,155,845 A   10/1992   Beal et al.
2003/0074417 A1 * 4/2003 Kasako et al. ............. 709/217
2003/0105852 A1 * 6/2003 Das et al. .................. 709/223
2004/0148376 A1 * 7/2004 Rangan et al. ............. 709/223

FOREIGN PATENT DOCUMENTS

JP           10-269030           10/1998

* cited by examiner

Primary Examiner—Charles Rones
(74) Attorney, Agent, or Firm—Townsend and Townsend and Crew LLP

(57) ABSTRACT

A technique is described to enable exclusive control on a file basis in a storage system while remote double recording is performed between storage controllers. A first shared-file controller has a table that stores control information used for excluding read and write to that file on a file basis. When the shared-file controller receives a data write request, it sets access to the file as exclusive, and then issues a command to a second shared file controller to set control information for that file. After data is written into a storage medium and mirrored to a second storage medium, a copy of the file management information is stored in memories of the shared-file controllers. The consistency of the file management information is maintained between the two file controllers by copying the file management information over the network.

7 Claims, 9 Drawing Sheets

METHOD, APPARATUS AND SYSTEM FOR REMOTE FILE SHARING

BACKGROUND OF THE INVENTION

The present invention relates to a storage system, and more particularly to a method, apparatus, and system for remote file sharing in which double-written data can be shared from respective higher-level devices connecting to storage controllers in a storage system where data on a storage medium is double-written between the storage controllers without involvement by the higher-level devices in particular.

A technique for transferring data between storage controllers to double-write the data between the storage controllers without involvement by higher-level devices, that is to say, remote double recording, is described in U.S. Pat. No. 5,155,845. In this prior art, when a main storage controller receives, from a higher-level device, a main/secondary specification command specifying that the storage mediums under the control of the storage controllers are used as main and secondary storage mediums for example, the main storage controller copies data stored in the storage medium of the main storage controller to a storage medium of a secondary storage controller. When the higher-level device issues a write request to the main storage controller together with the main/secondary specification, the main storage controller stores the data, which should be written, in the main storage controller, and then issues a write request to the secondary storage controller.

The above-mentioned operation realizes the remote double recording. Even if a disaster or a failure causes the main storage controller to be incapable of inputting/outputting data, the remote double recording permits continuous operation using a secondary system comprising a higher-level device, and a secondary storage controller connecting to the higher-level device.

On the other hand, there is known a technique for sharing, from a plurality of higher-level devices, data stored in a storage medium under a storage controller; that is to say, this technique is called a file-sharing system. In this prior art, when a higher-level device issues a data write request to a storage controller, the storage controller stores data, which is transferred from the higher-level device, in a subordinate storage medium. When another higher-level device issues a request for reading/writing the data during the write processing, the another higher-level device which has issued the request is reported that because the storage controller is writing the data, the data cannot be accessed. As a result of the processing described above, when the another higher-level device issues a request for reading the data while the data from the former higher-level device is being written to the storage controller, the data is not read before the writing is completed. Even if the another higher-level device issues a request for writing the data, the data is not written before the writing is completed.

The operation described above permits the plurality of higher-level devices to share data under the storage controller. Sharing a file among the plurality of higher-level devices enables distributed processing, which reduces a processing load of each higher-level device.

Japanese Patent Laid-Open No. Hei 10-269030 discloses a remote file-sharing system that performs remote double recording between storage controllers and also permits a respective higher-level device to share a file.

SUMMARY OF THE INVENTION

According to the prior art, each of higher-level devices can share a file across a plurality of storage controllers which performs remote double recording. However, a storage medium is excluded on a magnetic-disk cylinder basis, and a write command issued by the higher-level device is required to specify a cylinder number. Therefore, the following problem is produced: when issuing a write command, the higher-level device must identify a physical section of a magnetic disk unit, which is called a cylinder, with the result that when the higher-level device issues a write command for a set of logical data like a file, exclusive control on a logical unit basis is not possible.

In addition, there is a storage controller characterized in that although each file has its file information on a storage medium, a copy of file management information is held in a memory of the storage controller to improve performance of accesses from a higher-level device to the file management information. In this case, when the file management information in the storage controller is updated according to a request from the higher-level device or without involvement by the higher-level device, it is necessary to perform remote double recording so that consistency of the file management information on a storage medium is achieved across a plurality of storage controllers. In addition to it, the file management information in the memory is also required to be consistent with the updated file management information.

An object of the present invention is to provide a method, apparatus, and system for remote file-sharing capable of exclusive control on a file basis.

Another object of the present invention is to provide a method, apparatus, and system for remote file-sharing, in which consistency of file management information in a memory is maintained across storage controllers.

According to one aspect of the present invention, there is provided a remote file sharing method used for a remote file-sharing system, the remote file-sharing system comprising:

a first computer system in which a first higher-level device and a first file input/output device are connected to each other via a first network; and a second computer system in which a second higher-level device and a second file input/output device are connected to each other via the first network;

wherein the first file input/output device and the second file input/output device are connected to each other via a second network;

in response to a data write request from the first higher-level device, data is written into a storage medium in the first file input/output device, and the data is remotely double-written into a storage medium in the second file input/output device via the second network; and files stored in both of the first file input/output device and the second file input/output device are shared between the first higher-level device and the second higher-level device;

the method comprising the steps of:

receiving, by the first file input/output device, the data write request with specification of a specific file from the higher-level device, setting read/write exclusive control information in a table means, for the specific file, at a value indicating an exclusive state if the read/write exclusive control information does not indicate an exclusive state, and specifying the file to request the second file input/output device, via the first network, to put the file into an exclusive state;

setting read/write exclusive control information in a table means corresponding to the table means, for the specific file, at a value indicating an exclusive state by the second file input/output device if the read/write exclusive control information does not indicate an exclusive state, and reporting to the first file input/output device that the exclusion setting has been successfully completed;

after writing of data into the storage medium in the first file input/output device and the remote double writing by the first file input/output device have been completed, releasing the exclusive state of the exclusive control information for the file in the table means, and requesting the second file input/output device to release the exclusive state of the specific file; and releasing the exclusive state of the exclusive control information for the specific file by the second file input/output device.

In addition, the present invention is characterized by a remote file-sharing system and a file input/output device which have the functions described above.

According to another aspect of the present invention, there is provided a remote file-sharing method, the remote file-sharing method comprising the steps of:

receiving, by the first file input/output device, a file management information update request with specific file specification by the first higher-level device, updating file management information, in a memory, for the specified file, and after the writing of the file management information into the storage medium in the first file input/output device and the remote double writing have been completed, specifying the specific file to request the second file input/output device, via the first network, to update the file management information; and double-writing the file management information in the memory for the specified file by the second file input/output device.

In addition, the present invention is characterized by a remote file-sharing system and a file input/output device which have the functions described above.

DETAILED DESCRIPTION OF THE PREFERRED EMBODIMENTS

Figure 1:
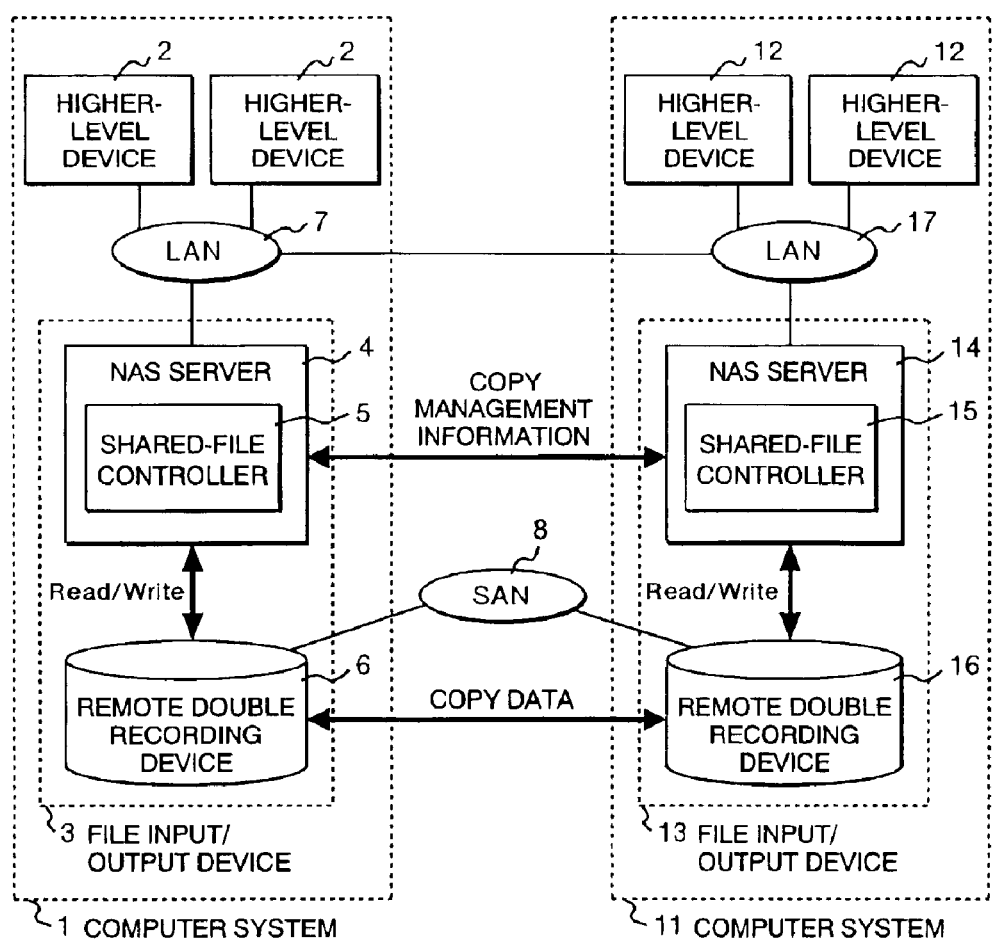
FIG. 1 is a configuration diagram of a remote file-sharing system according to an embodiment.

FIG. 1 is a diagram illustrating a configuration example of a remote file-sharing system according to this embodiment. This system comprises two computer systems, that is to say, a computer system 1 and a computer system 11. The computer system 1 includes higher-level devices 2, and a storage controller called a file input/output device 3 in this embodiment; and the computer system 11 includes higher-level devices 12, and a storage controller called a file input/output device 13. In general, the higher-level devices 2, 12 are computers.

In the present invention, there is no difference in configuration and control between the two computer systems; and distinction shall not be made in terms of main and secondary between the two computer systems. However, for convenience of explanation, description of the configuration and the operation will be made mainly on the computer system 1, and if necessary, the other computer system 11 is called a remote system.

The file input/output device 3 is connected to the higher-level device 2 and the file input/output device 13 through local area networks (LAN) 7, 17 and a storage area network (SAN) 8 both capable of transferring an input/output command and data. The file input/output device 3 comprises a NAS (Network Attached Storage) server 4 and a remote double recording device 6. When the file input/output devices 3, 13 transfer a command or data, the LANs 7, 17 are used to transfer a command and data between the NAS servers 4, 14. In addition, when a command and data is transferred between the remote double recording devices 6, 16, the SAN 8 is used.

The NAS server 4 comprises an interface for transmitting and receiving an input/output command and data to and from the higher-level device 2 or the NAS server 14 via the LANs 7, 17, and a shared-file controller 5. The shared-file controller 5 processes the input/output command received from the higher-level device 2 or the NAS server 14. In addition, the shared-file controller 5 also has a function of issuing an input/output command to the NAS server 14, in particular, a command processing function used when sharing a file across the file input/output devices 3, 13. Further, the shared-file controller 5 controls read from, and write to, the remote double recording device 6.

The remote double recording device 6 has a storage medium for storing data. The remote double recording device 6 receives a data read/write command from the shared-file controller 5, and then executes data read/write required for its own storage medium. In addition, in the case of writing data, the remote double recording device 6 transmits the same data to the remote double recording device 16 via the SAN 8 to perform remote double recording.

Figure 2:
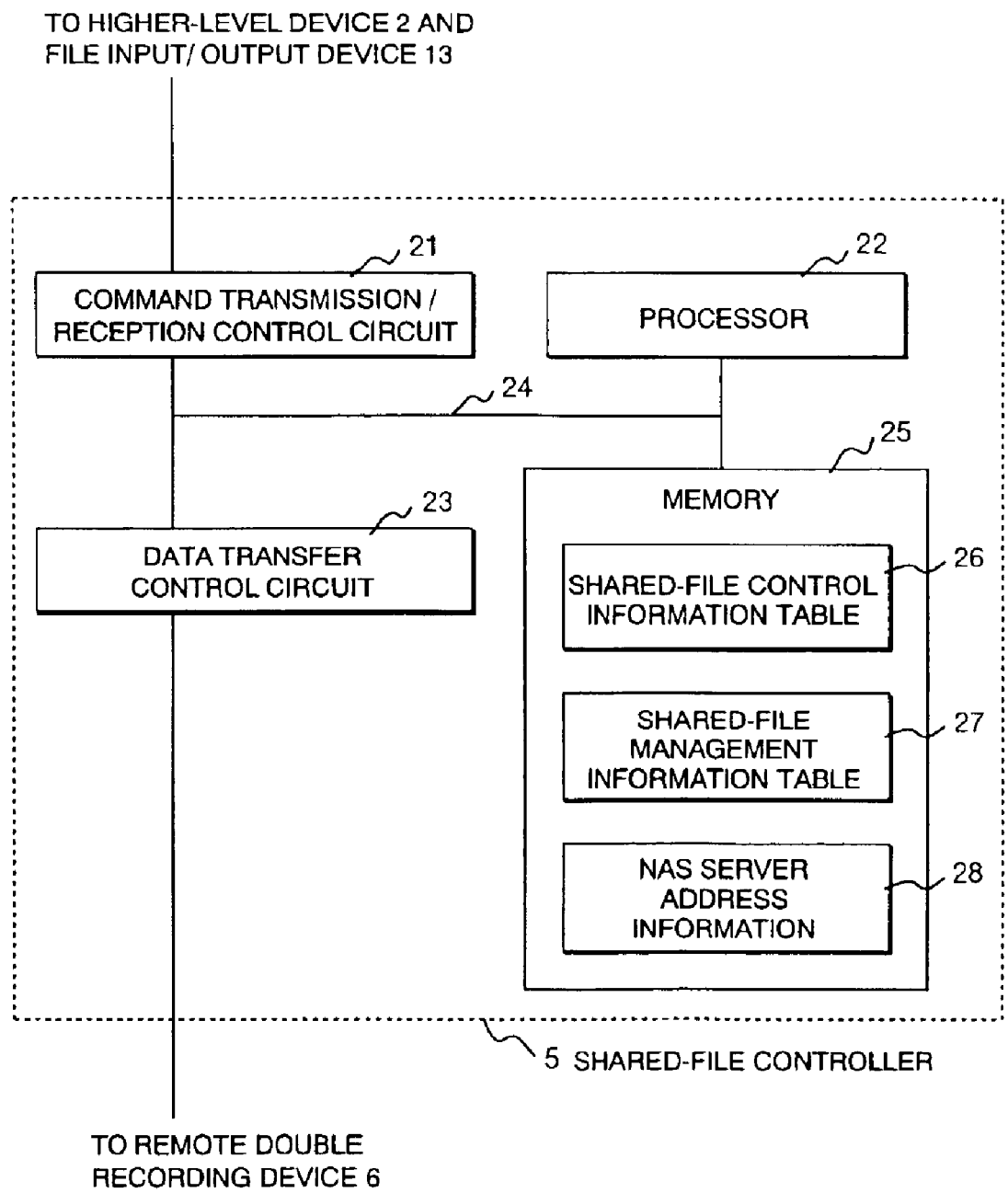
FIG. 2 is a diagram-illustrating a configuration of a shared-file controller 5 according to the embodiment.

FIG. 2 is a diagram illustrating an internal configuration of the shared-file controller 5. The shared-file controller 5 comprises a command transmission/reception control circuit 21 for transmitting and receiving an input/output command and data from the higher-level device 2 and the file input/output device 13; a data transfer control circuit 23 for passing data to the remote double recording device 6; a processor 22 for controlling the circuits 21, 23 described above through a control line 24; and a memory 25 for storing both a remote file-sharing program which operate on the processor 22 and the tables.

The command transmission/reception control circuit 21 is usually in a state of waiting for a command from the higher-level device 2, and controls the command reception. When a command to be transmitted to the remote file input/output device 13 comes via the LANs 7, 17, the processor 22 switches the command reception control to command transmission control. After the command transmission is completed, the command transmission control is switched to the command reception control.

The memory 25 comprises a shared-file control information table 26 that stores exclusive control information used for file-sharing with a remote shared-file controller 15; a shared-file management information table 27 that stores file management information used for file-sharing with the remote shared-file controller 15; and NAS server address information 28 that includes address information of the NAS server 14 used when transmitting an input/output command to the remote NAS server 14 to pass data.

Figure 3:
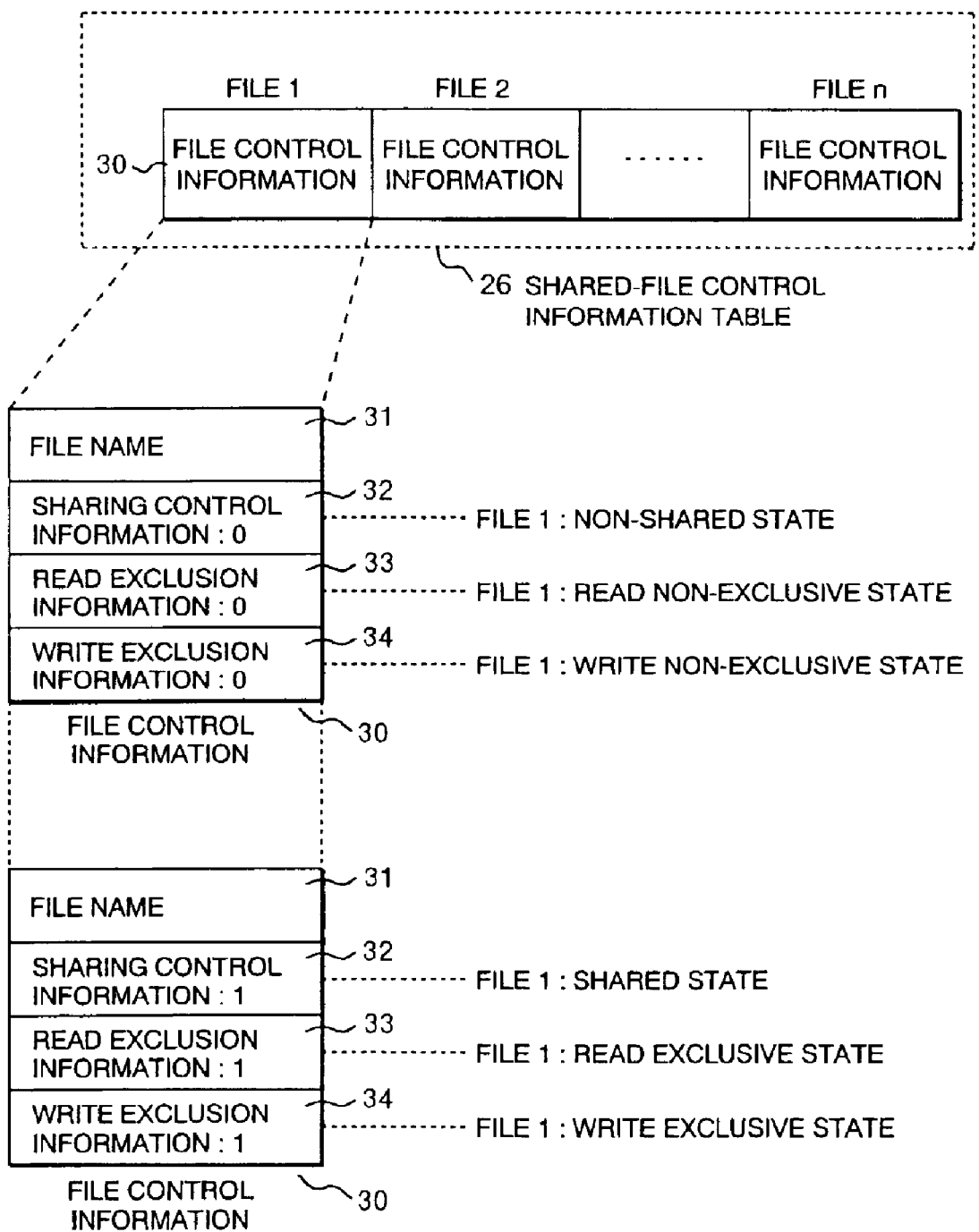
FIG. 3 is a diagram illustrating an example of how data of a shared-file control information table 26 is configured.

FIG. 3 is a diagram illustrating an example of how data of the shared-file control information table 26 is configured. Because the higher-level device 2 generally accesses data of the file input/output devices 3, 13 on a file basis, each file has file control information 30 in this example of data configuration, and thereby an input/output request from the higher-level device 2 is excluded on a file basis. A piece of the file control information 30 comprises: a file name 31 that stores information identifying a file; sharing control information 32 that stores information used for controlling file sharing with the remote file input/output device 13; READ exclusion information 33 that stores information used for exclusive control of a read request from the higher-level device 2; and WRITE exclusion information 34 that stores information used for exclusive control of a write request from the higher-level device 2.

When sharing a file with the remote file input/output device 13, 1 is stored in the sharing control information 32 corresponding to the file to be shared. When the file is not shared, 0 is stored. When exclusively controlling a read request from the higher-level device 2 in a shared state, 1 is stored in the READ exclusion information 33 corresponding to the file to be excluded. When the file is not excluded, 0 is stored. In a similar manner, when exclusively controlling a write request from the higher-level device 2 in a shared state, 1 is stored in the WRITE exclusion information 34 corresponding to the file to be excluded. When the file is not excluded, 0 is stored.

Figure 4:
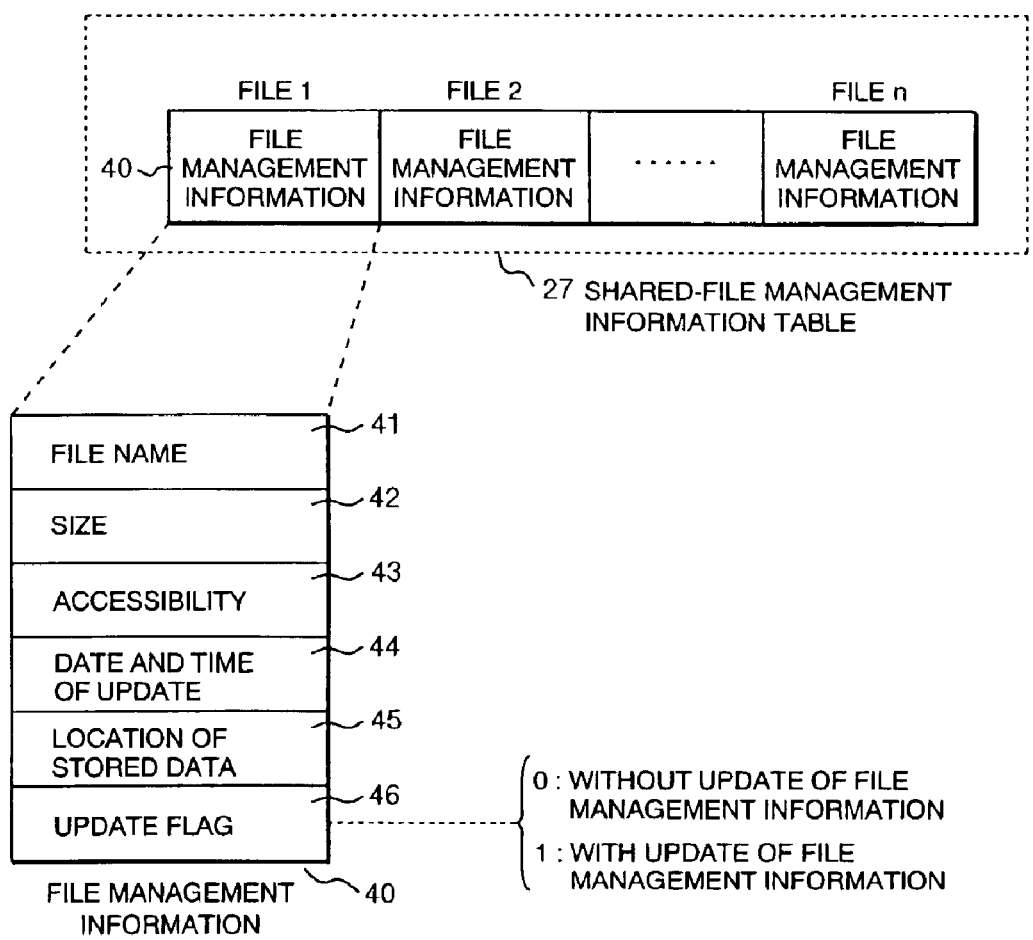
FIG. 4 is a diagram illustrating an example of how data of a shared-file management information table 27 is configured.

FIG. 4 is a diagram illustrating an example of how data of the shared-file management information table 27 is configured. As is the case with the shared-file control information table 26, this table also has file management information 40 on a file basis. A piece of the file control information 40 comprises the following elements: a file name 41 that stores information identifying a file; a size 42 that stores a size of the file; accessibility 43 that stores an access permission state of the file; date and time of update 44 that stores date and time of update of the file; a location of stored data 45 that stores a location of stored data on a storage medium; and an update flag 46. The location of stored data 45 indicates a starting position from which the file is stored in the remote double recording device 6, and is expressed by a block number on a logical volume, or the like. Information from the file name 41 to the location of stored data 45 agrees with file management information about the file on the remote double recording device 6. The update flag 46 is provided so as to control a remote copy and remote double recording of the file management information. When the file management information is updated, the update flag 46 is set at 1. When the file management information is not updated, it is set at 0.

Figure 5:
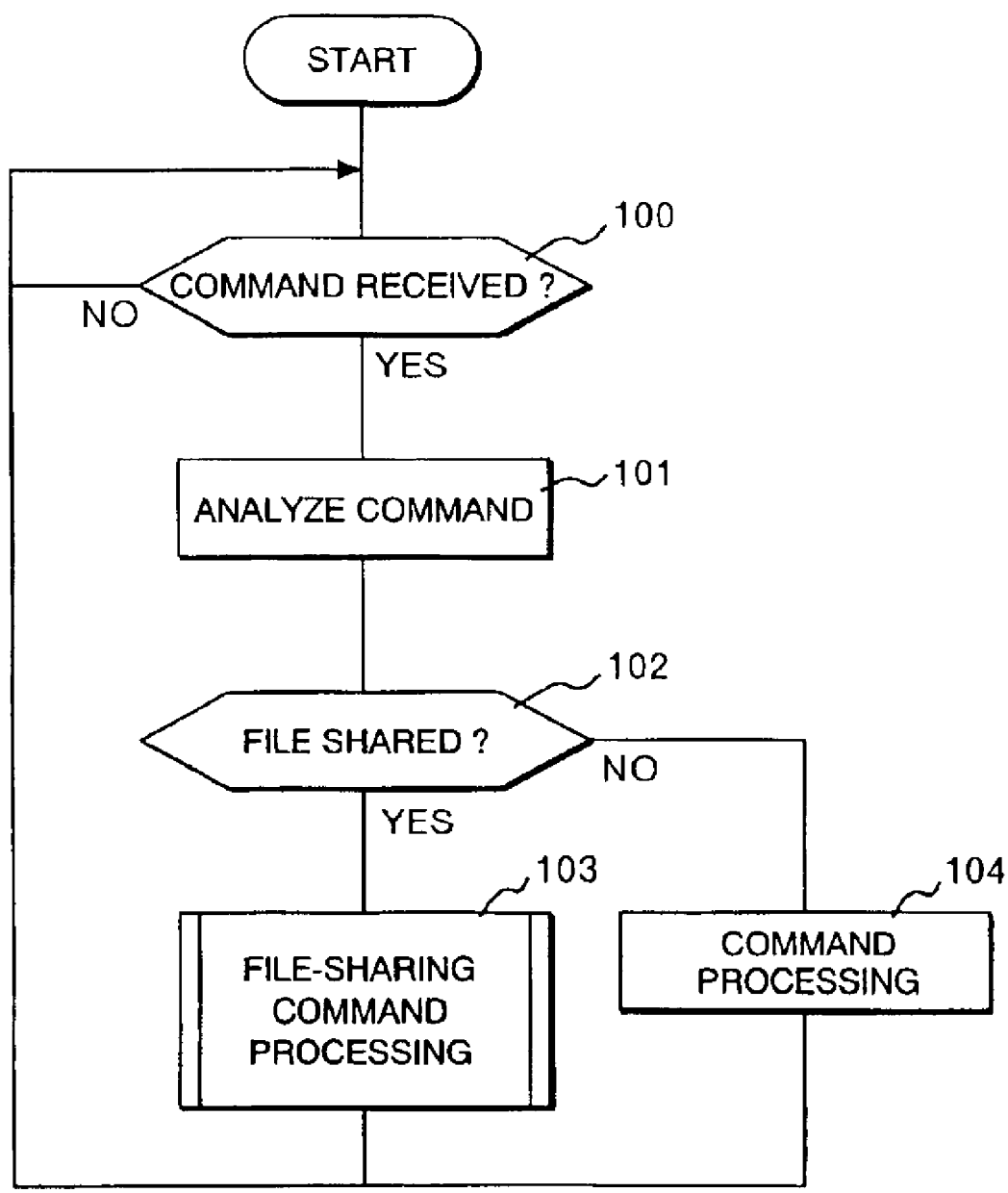
FIG. 5 is a flowchart illustrating a process flow of a remote file-sharing program according to the embodiment.
Figure 6:
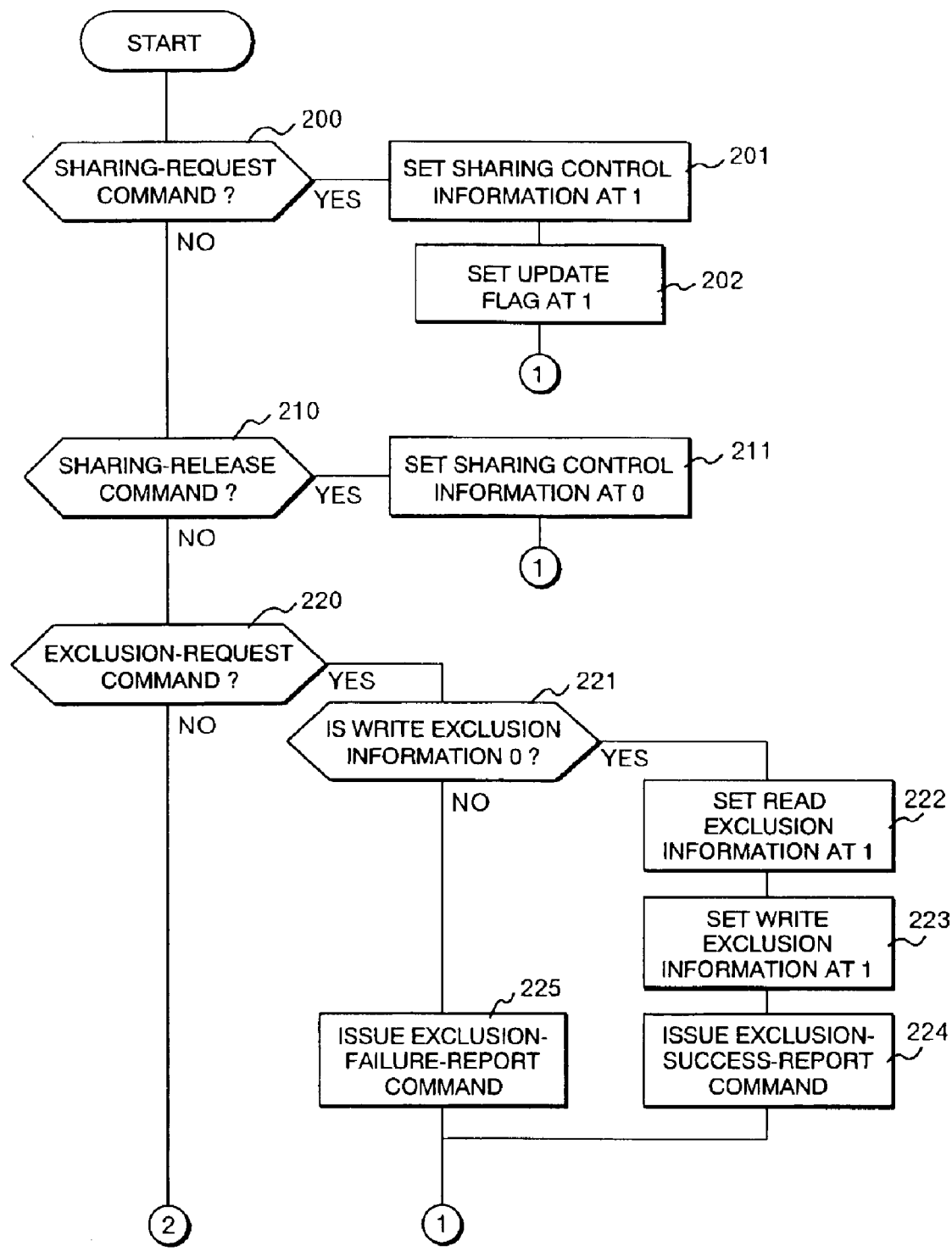
FIG. 6 is a flowchart illustrating a process flow of the remote file-sharing program which executes a file-sharing command according to the embodiment.
Figure 7:
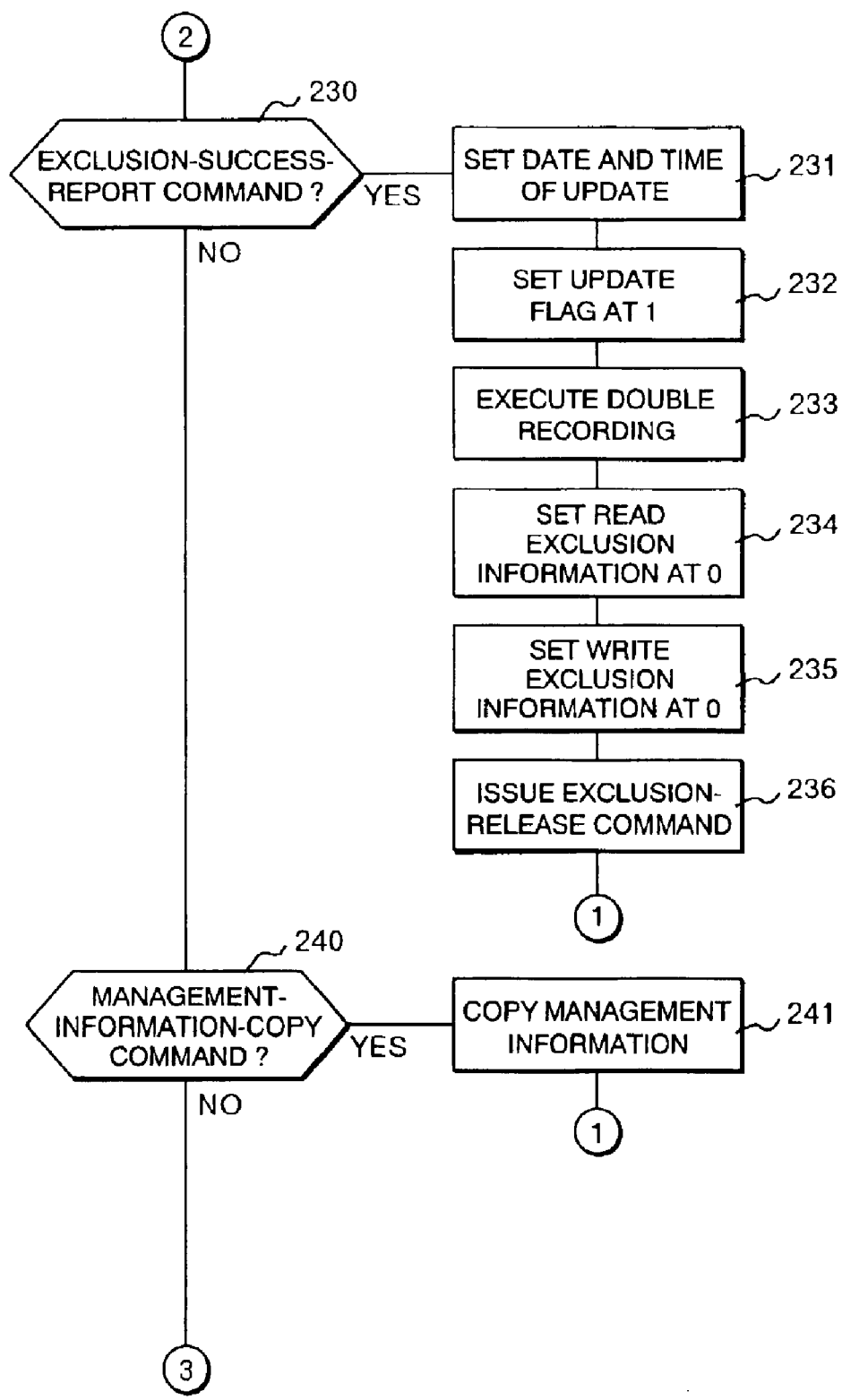
FIG. 7 is a flowchart (continued) illustrating a process flow of the remote file-sharing program which executes a file-sharing command according to the embodiment.
Figure 8:
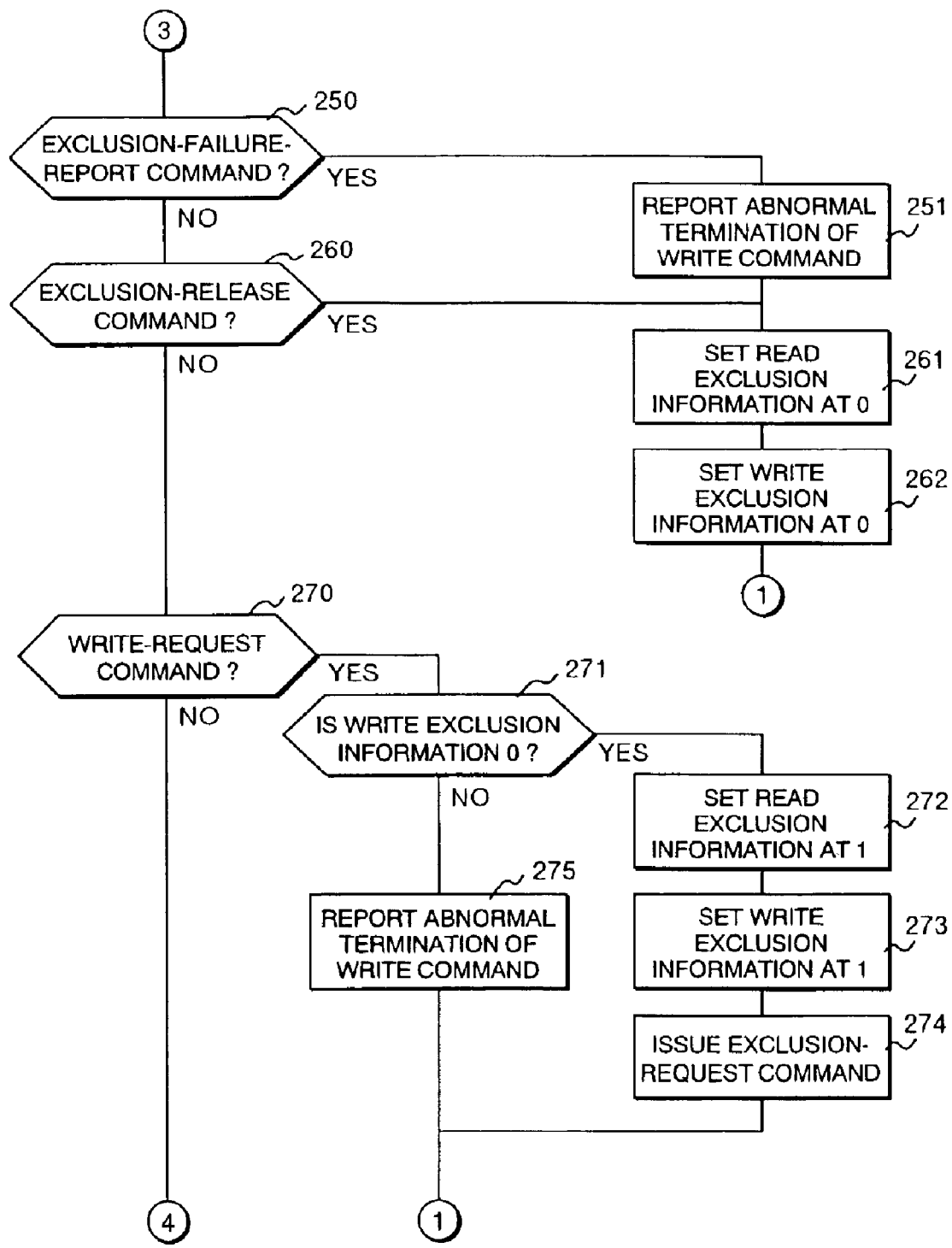
FIG. 8 is a flowchart (continued) illustrating a process flow of the remote file-sharing program which executes a file-sharing command according to the embodiment.
Figure 9:
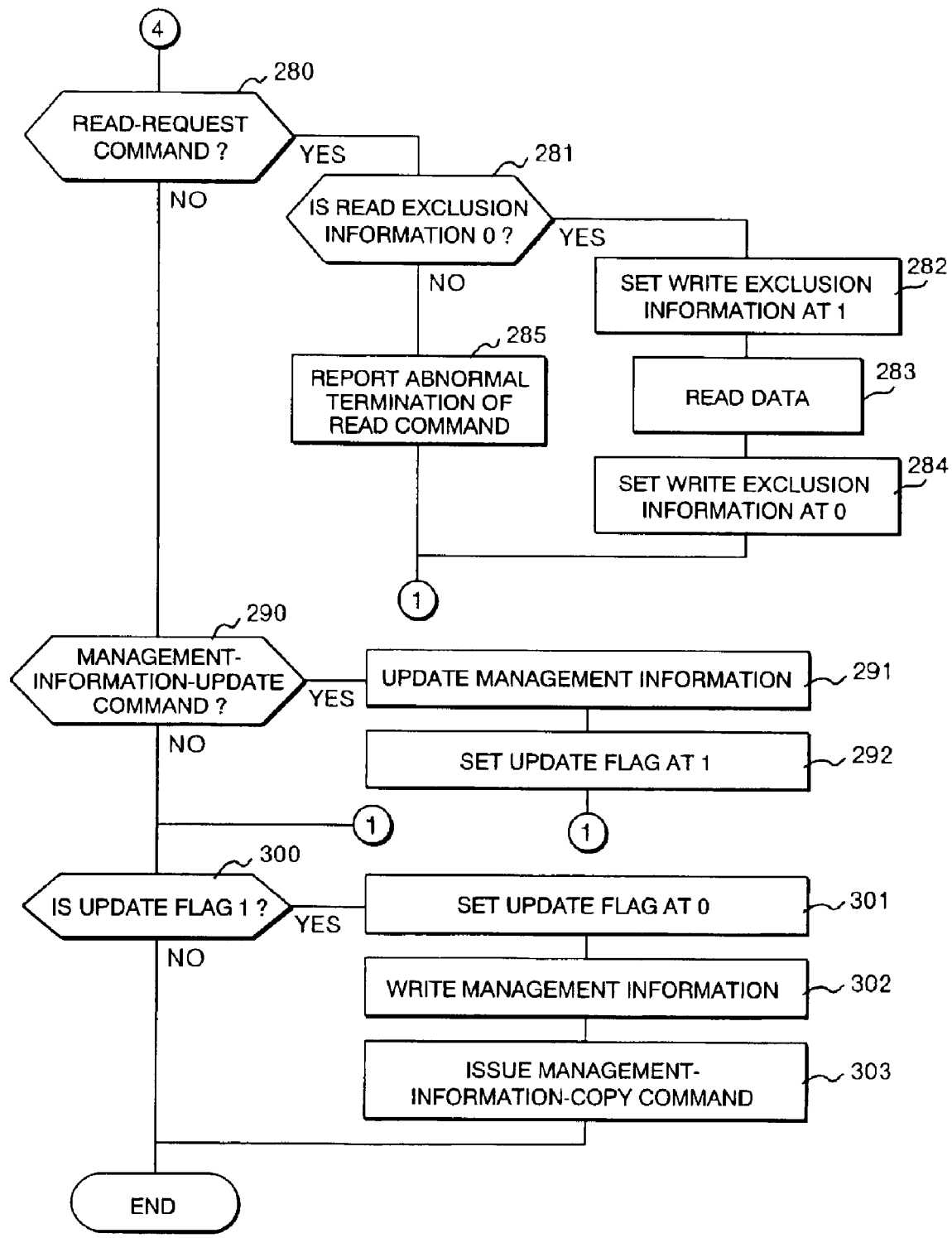
FIG. 9 is a flowchart (continued) illustrating a process flow of the remote file-sharing program which executes a file-sharing command according to the embodiment.

FIG. 5 is a flowchart illustrating a process flow of a remote file-sharing program. When the higher-level device 2 issues a READ request command or a WRITE request command to the file input/output device 3, the remote file-sharing program executes the command. Until the remote file-sharing program receives a command from the higher-level device 2 or the remote file input/output device 13 through the command transmission/reception control circuit 21, the remote file-sharing program keeps a command reception waiting state (step 100). As soon as the remote file-sharing program receives a command from the higher-level device 2 or the file input/output device 13, the remote file-sharing program analyzes the command (step 101), and then judges whether or not the sharing control information 32 of the shared-file control information table 26 for a specified file indicates a file-sharing state, or determines whether a kind of the received command is a sharing-request command or a sharing-release command described below (step 102). If the sharing control information 32 indicates a file-sharing state, or if the received command is a command relating to file sharing, file-sharing command processing is performed (step 103) before the process returns to the step 100. If not, its command processing is performed (step 104) before the process returns to the step 100.

If the sharing control information 32 does not indicate the file-sharing state, the NAS server 4 issues a READ command or a WRITE command on a block basis to the remote double recording device 6 through the data transfer control circuit 23 as before. The remote double recording device 6 issues a READ command or a WRITE command to a physical storage medium. If the WRITE command is issued, the remote double recording device 6 transmits the written data to the remote double recording device 16 via the SAN 8 to perform remote double recording.

If a file is shared between the file input/output device 3 and the remote file input/output device 13, the higher-level device 2 issues, on a file basis, a command for putting a file into a sharing mode (hereinafter referred to as a sharing-request command) to the file input/output devices 3, 13, which are connected to the higher-level device 2.

FIGS. 6 through 9 are flowcharts illustrating processing procedures of the remote file-sharing program which executes the file-sharing commands. When the shared-file controller 5 receives a sharing-request command from the higher-level device 2 (step 200YES), the sharing control information 32 of the shared-file control information table 26 for a specified file is set at 1 (step 201), and the update flag 46 of the specified file is set at 1 so that the file management information 40 of the shared-file management information table 27 of the file input/output device 3 agrees with the file management information 40 of the remote file input/output device 13 (step 202).

If the update flag 46 for the file is set at 1 (step 300YES), the shared-file controller 5 sets the update flag 46 at 0 (step 301). After that, the shared-file controller 5 issues a WRITE command to the remote double recording device 6, and then writes management information in the file management information 40 into the remote double recording device 6 (step 302). The remote double recording device 6 writes the file management information into its own storage medium, and transmits the file management information to the remote double recording device 16 via the SAN 8 to perform remote double recording. As soon as the double recording of the file management information is completed, the shared-file controller 5 transmits a command for writing the file management information 40 to the remote shared-file controller 15 (hereinafter referred to as a management-information-copy command) (step 303). If the received command is a management-information-copy command (step 240YES), the remote shared-file controller 15 overwrites file management information of the file with the file management information 40 transmitted from the shared-file controller 5 (step 241). Then, the process proceeds to a step 300

To release file sharing, a sharing-release command is issued from the higher-level device 2. If the higher-level device 2 issues a sharing-release command to the file input/output device 3, the shared-file controller 5 judges that the received command is a sharing-release command (step 210YES), and then set the sharing control information 32 of the shared-file control information table 26 for a specified file at 0 (step 211) before the process proceeds to the step 300. Release of file sharing is required only when a disaster or a failure causes a remote double recording system to become unavailable. Usually, a file is in a file-sharing state.

In a file-sharing state, when the shared-file controller 5 receives a WRITE request command, supplementary information of which is a file name, from the higher-level device 2 (step 270YES), the shared-file controller 5 judges whether or not WRITE exclusion information 34 of the shared-file control information table 26 for the specified file indicates a WRITE exclusive state (step 271). If it indicates the exclusive state, the shared-file controller 5 reports to the higher-level device 2 that the WRITE request command cannot be processed (step 275), and then the process proceeds to the step 300. If it does not indicate the exclusive state, the shared-file controller 5 stores 1 in both the READ exclusion information 33 and the WRITE exclusion information 34 of the shared-file control information table 26 for the specified file (steps 272, 273). The shared-file controller 5 issues, to the remote file input/output device 13, a command for exclusive control of an input/output request from the remote higher-level device 12 (hereinafter referred to as an exclusion-request command) (step 274) before the process proceeds to the step 300. The NAS server 4 obtains a network address of the NAS server 14 with reference to the NAS server address information 28, and then transmits an exclusion-request command to the NAS server 14 via the LANs 7, 17.

When the remote shared-file controller 15 receives the exclusion-request command, supplementary information of which is a file name (step 220YES), the remote shared-file controller 15 judges whether or not WRITE exclusion information 34 of the shared-file control information table 26 for the specified file indicates a WRITE exclusive state (step 221). If it indicates the exclusive state, the remote shared-file controller 15 transmits, to the file input/output device 3, a command for reporting that the exclusion-request command cannot be processed (hereinafter referred to as an exclusion-failure-report command) (step 225), before the process proceeds to the step 300. If it does not indicate the exclusive state, the shared-file controller 15 stores 1 in both the READ exclusion information 33 and the WRITE exclusion information 34 of the shared-file control information table 26 for the specified file (steps 222, 223). Next, the remote shared-file controller 15 issues, to the file input/output device 3, a command for reporting that the exclusion-request command could be successfully processed (hereinafter referred to as an exclusion-success-report command) (step 224). Then, the process proceeds to the step 300.

When the shared-file controller 5 receives the exclusion-failure-report command, supplementary information of which is a file name (step 250YES), the shared-file controller 5 reports to the higher-level device 2 that the WRITE request command cannot be processed (step 251). Next, the shared-file controller 5 stores 0 in the READ exclusion information 33 and in the WRITE exclusion information 34, for the specified file (steps 261, 262), before the process proceeds to the step 300. As a result of processing in the steps 261 and 262, the file control information 30 of the shared-file controller 5 temporarily disagrees with the file control information 30 of the shared-file controller 15 for the same file. However, immediately after the processing, the shared-file controller 5 receives an exclusion-request command for the file from the shared-file controller 15, and subsequently sets the READ exclusion information 33 and the WRITE exclusion information 34 at 1, leading to a state in which both of the file control information 30 agrees with each other.

If the received command is an exclusion-success-report command (step 230YES), the shared-file controller 5 updates the date and time of update 44 of the file management information 40 of the shared-file management information table 27 for the specified file, and then sets the update flag 46 for the file at 1 (steps 231, 232).

The shared-file controller 5 issues a WRITE command, on a block basis, to the remote double recording device 6 through the data transfer control circuit 23 to write data (step 233). The remote double recording device 6 issues a WRITE command to a physical storage medium. In addition, the remote double recording device 6 transmits the written data to the remote double recording device 16 via the SAN 8 to perform remote double recording. When the double recording into the storage medium is completed, the remote double recording device 16 reports to the remote double recording device 6, via the SAN 8, that the remote double recording has been completed. Until all of data attached to the WRITE request command from the higher-level device 2 is processed, the shared-file controller 5 repeatedly issues a WRITE command to the remote double recording device 6, and the remote double recording device 6 repeats both data recording to its own storage medium and remote double recording accordingly. As soon as the last block of the data attached to the WRITE request command is remotely double-recorded, the remote double recording device 6 receives a report from the remote double recording device 16 that the recording of the block has been completed, and then reports the completion to the shared-file controller 5. This is the time at which the data writing has been completed.

As soon as the data writing is completed, the shared-file controller 5 stores 0 in the READ exclusion information 33 and in the WRITE exclusion information 34, for the file (steps 234, 235). Next, a command for releasing an exclusion request that exclusively controls an input/output request from the remote higher-level device 12 (hereinafter referred to as an exclusion-release command) is issued via the LAN 7 to the remote file input/output device 13 (step 236). Then, the process proceeds to the step 300. Because the update flag 46 of the file is set at 1, the steps 301 through 303 are executed.

If the received command is an exclusion-release command (step 260YES), the remote shared-file controller 15 stores 0 in the READ exclusion information 33 and in the WRITE exclusion information 34 for the file (steps 261, 262). Then, the process proceeds to the step 300.

In a file-sharing state, when the shared-file controller 5 receives a READ request command, supplementary information of which is a file name, from the higher-level device 2 (step 280YES), the shared-file controller 5 judges whether or not READ exclusion information 33 of the shared-file control information table 26 for the specified file indicates a READ exclusive state (step 281). If it indicates the exclusive state, the shared-file controller 5 reports to the higher-level device 2 that the READ request command cannot be processed (step 285), and then the process proceeds to the step 300. If it does not indicate the exclusive state, the shared-file controller 5 stores 1 in the WRITE exclusion information 34 of the shared-file control information table 26 for the specified file (step 282), and then issues a READ command, on a block basis, to the remote double recording device 6 through the data transfer control circuit 23 to read data (step 283). The remote double recording device 6 issues a READ command to a physical storage medium. Until data requested by the READ request command from the higher-level device 2 is totally read, the shared-file controller 5 repeatedly issues a READ command to the remote double recording device 6. After the requested data is read, the NAS server 4 transfers the read data to the higher-level device 2. As soon as the data reading by the remote double recording device 6 is completed, the shared-file controller 5 stores 0 in the WRITE exclusion information 34 for the file (step 284). Then, the process proceeds to the step 300. An object of setting the WRITE exclusion information 34 at 1 in the step 282 is to exclude WRITE request commands issued from another higher-level device 2 for the same file, which has a possibility that the file is simultaneously processed.

While executing a READ request command, data in the storage medium under the control of the remote double recording device 6 does not change. Accordingly, both of the file input/output devices 3, 13 keep their data consistent to each other. For this reason, unlike the WRITE request command, it is not necessary to issue an exclusion-request command to the remote shared-file controller 15 to exclude an access to the data from the higher-level device 12.

When the higher-level device 2 updates the file management information 40 by a command other than the WRITE request command, for a purpose such as a change of a file name, and a change of accessibility, the higher-level device 2 issues a command (hereinafter referred to as a management-information-update command) to the shared-file controller 5. As soon as the shared-file controller 5 receives the management-information-update command (step 290YES), the shared-file controller 5 updates the file management information 40 for the specified file (step 291) and then sets its update flag 46 at 1 (step 292). Because the update flag 46 of the file is set at 1, the steps 301 through 303 are executed.

In the embodiment described above, the shared-file controller 5 transmits the management-information-copy command to the shared-file controller 15 in the step 303. Instead of it, a command for reporting that the file management information 40 has been updated (hereinafter referred to as a management-information-update-notification command) may also be transmitted. For this purpose, a flag "2: File management information of another system has been updated" is added to the update flag 46 of the file management information 40. If the received command is a management-information-update-notification command (step 240), instead of copying management information, the shared-file controller 15 sets the update flag 46 for the specified file at 2 so as to read file management information, which has been double-recorded by the shared-file controller 5, into the memory 25. When the shared-file controller 15 detects that the update flag 46 for the file has been set at 2, the shared-file controller 15 sets the update flag 46 at 0. After that, the shared-file controller 15 issues a READ command to the remote double recording device 16 to read file management information of the file, and then updates the file management information 40.

As described above, according to this embodiment, after the file control information 30 of both of the file input/output devices 3, 13 for the same file is set at a value indicating an exclusive state, data for the file in storage media of both of the file input/output devices 3, 13 is remotely double-recorded. Accordingly, access to the data by any of the higher-level devices 12 is prohibited during the double writing of data, enabling file sharing across the file input/output devices 3, 13. In addition to it, consistency of data is kept between the file input/output devices 3, 13. Moreover, the file management information on a storage medium is also remotely double-recorded by updating the file management information 40 of one of the file input/output devices 3, 13, and thereafter the updated file management information 40 is copied to the other file input/output device. Further, when transferring a command and data between the NAS servers 4, 14, the command and data are transferred via the LANs 7, 17. Therefore, a data transfer load via the SAN 8 is reduced, which leads to smooth data transfer for double recording.

As described above, according to the present invention, the file input/output device is configured to perform exclusive control on a file basis according to file specification by the higher-level device. Accordingly, it is possible to control exclusively a logical data set as a file from the higher-level device. In addition, with remote double recording of file management information, file management information in a memory of the file input/output device can be copied. Furthermore, because the file management information is copied via a network which is different from that used for double recording between storage media, a data transfer load via the network used for double recording is reduced, which leads to smooth data transfer for double recording.

What is claimed is:

1. A remote file sharing method used for a remote file-sharing system, said remote file-sharing system comprising:

a first computer system in which a first higher-level device and a first file input/output device are connected to each other via a first network; and a second computer system in which a second higher-level device and a second file input/output device are connected to each other via said first network;

wherein said first file input/output device and said second file input/output device are connected to each other via a second network;

in response to a data write request from said first higher-level device, data is written into a storage medium in said first file input/output device, and said data is remotely double-recorded into a storage medium in said second file input/output device via said second network; and files stored in both of said first file input/output device and said second file input/output device are shared between said first higher-level device and said second higher-level device;

said method comprising the steps of:

receiving, by said first file input/output device, said data write request with specification of a specific file, setting read/write exclusive control information in a table means, for said specific file, at a value indicating an exclusive state if the read/write exclusive control information does not indicate an exclusive state, and specifying said specific file to request said second file input/output device, via said first network, to put said specific file into an exclusive state;

setting read/write exclusive control information in a table means corresponding to said table means, for said specific file, at a value indicating an exclusive state by said second file input/output device if the read/write exclusive control information does not indicate an exclusive state, and reporting to said first file input/output device that the exclusion setting has been successfully completed;

after writing of said data into the storage medium in said first file input/output device and the remote double recording by said first file input/output device have been completed, releasing the exclusive state of the exclusive control information for said specific file in said table means, and requesting said second file input/output device to release the exclusive state of said specific file; and releasing the exclusive state of the exclusive control information for said specific file by said second file input/output device.

2. A remote file sharing method according to claim 1, comprising the steps of:

receiving, by said first file input/output device, a file management information update request with specific file specification by said first higher-level device, updating file management information, in a memory, for the specified file, and after the writing of the file management information into the storage medium in said first file input/output device and said remote double recording have been completed, specifying the file to request said second file input/output device, via the first network, to update said file management information; and double-recording the file management information in the memory for said specified file by said second file input/output device.

3. A file input/output device, comprising:

interface means for connecting a higher-level device to another file input/output device via a first network;

storing means for setting exclusive control information which indicates an exclusive state or a nonexclusive state of read and write operation on a file basis;

exclusive state setting means for setting said exclusive control information for a specific file at a value indicating an exclusive state if said exclusive control information does not indicates an exclusive state, when a data write request with specification of said specific file is received from said higher-level device;

exclusive state requesting means for requesting said another file input/output device to put said specific file into the exclusive state;

double recording means for recording data into a storage medium and remotely double recording the data into a storage medium in said another file input/output device via a second network, when a report is received from said another file input/output device that the exclusive control has been successfully completed;

exclusive state releasing means for releasing the exclusive state of said exclusive control information for said specific file as soon as the recording of said data and the remote double recording are completed;

release requesting means for requesting said another file input/output device to release the exclusive state of said specific file; and exclusive state setting means for setting said exclusive control information for a specified file at a value indicating an exclusive state if said exclusive control information does not indicate an exclusive state, when said another file input/output device specifies file identification and issues a request to put the specified file into an exclusive state.

4. A file input/output device according to claim 3, further comprising:

file management information updating means for updating a file management information for the specified specific file in a memory, when said file management information update request with specification of a specific file is received from said higher-level device;

update requesting means for requesting, with specifying the file, said another file input/output device via said first network to update said file management information after the writing of the file management information to the storage medium in said file input/output device and said remote double recording have been completed; and double-writing means for double writing said file management information for the specified file in said memory, when an update request to update said file management information is received from said another file input/output device.

5. A file input/output device, comprising:

interface means for connecting with both a higher-level device and another file input/output device via a first network;

storing means for storing, on a file basis, exclusive control information which indicates an exclusive state or a nonexclusive state of read and write operation;

exclusive state setting means for setting said exclusive control information for a specific file at a value indicating an exclusive state if said exclusive control information does not indicate an exclusive state, when a data write request with specification of said specific file is received from said higher-level device;

exclusive state requesting means for requesting said another file input/output device to put said specific file into an exclusive state;

remote double recording means for updating date and time of update in file management information for said specific file in a memory, when a report is received from said another file input/output device that the exclusive control has been successfully completed, for writing the data requested by said write request into a storage medium, and for remotely double recording into a storage medium in said another file input/output device via a second network;

exclusive state releasing means for releasing the exclusive state of said exclusive control information for said specific file, when the writing of the data and the remote double recording are completed;

release requesting means for requesting said another file input/output device to release the exclusive state of said specific file;

exclusive state setting means for setting exclusive control information for a specified file at a value indicating an exclusive state if the exclusive control information for the specified file does not indicate an exclusive state, when said another file input/output device issues a request with specifying a file identification to put the specified file into an exclusive state;

update requesting means for requesting, with specifying a specification, said another file input/output device via said first network to update the file management information after writing of the file management information into the storage medium in said file input/output device and the remote double recording have been completed, when the date and time of update in the file management information in the memory is updated; and double-writing means for double writing the file management information for a specified file in the memory, when an update request to update the file management information is received from said another file input/output device.

6. A remote file-sharing system, comprising:

a first computer system in which a first higher-level device and a first file input/output device are connected to each other via a first network; and a second computer system in which a second higher-level device and a second file input/output device are connected to each other via said first network;

wherein said first file input/output device and said second file input/output device are connected to each other via a second network;

said first file input/output device comprising:

interface means for connecting with both said first higher-level device and said second file input/output device via said first network;

storing means for storing, on a file basis, exclusive control information which indicates an exclusive state or a nonexclusive state of read and write operation;

exclusive state setting means for setting said exclusive control information for a specific file at a value indicating an exclusive state if said exclusive control information does not indicate an exclusive state, when a data write request with specification of said specific file is received from said first higher-level device;

exclusive state requesting means for requesting said second file input/output device to put said specific file into an exclusive state;

double recording means for recording data into a storage medium and remotely double recording the data into a storage medium in said second file input/output device via the second network, when a report is received from the second file input/output device that the exclusive control has been successfully completed;

exclusive state releasing means for releasing the exclusive state of said exclusive control information for said specific file as soon as the recording of said data and the remote double recording are completed; and release requesting means for requesting said second file input/output device to release the exclusive state of said specific file; and said second file input/output device comprising:

interface means for connecting with both said second higher-level device and said first file input/output device via said first network;

storing means for storing, on a file basis, exclusive control information which indicates an exclusive state or a nonexclusive state of read and write operation;

exclusive state setting means for setting said exclusive control information for said specific file at a value indicating an exclusive state if said exclusive control information for the specific file does not indicate an exclusive state, when a request to put said specific file into an exclusive state is received from said first file input/output device; and exclusive state releasing means for releasing the exclusive state indicated by said exclusive control information for said specific file, when a request to release the exclusive state of said specific file is received from said first file input/output device.

7. A remote file-sharing system according to claim 6, wherein:

said first file input/output device further comprises:

file management information updating means for updating file management information for the specified specific file in a memory, when a file management information update request with specification of a specific file is received from said first higher-level device; and update requesting means for requesting, with specifying the file, said second file input/output device via said first network to update said file management information after the writing of the file management information into the storage medium in said first file input/output device and said remote double recording have been completed; and said second file input/output device further comprises:

double-writing means for double writing said file management information for the specified file in a memory, when the update request for updating said file management information is received from said first file input/output device.

* * * * *